US010507862B2

(12) United States Patent
Abe et al.

(10) Patent No.: US 10,507,862 B2
(45) Date of Patent: Dec. 17, 2019

(54) STEERING DEVICE

(71) Applicant: YAMADA MANUFACTURING CO., LTD., Kiryu-shi (JP)

(72) Inventors: Tatsuya Abe, Kiryu (JP); Takuya Aiba, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 87 days.

(21) Appl. No.: 15/658,181

(22) Filed: Jul. 24, 2017

(65) Prior Publication Data

US 2018/0057037 A1 Mar. 1, 2018

(30) Foreign Application Priority Data

Aug. 31, 2016 (JP) .................................. 2016-170382

(51) Int. Cl.
*B62D 1/19* (2006.01)
*B62D 1/185* (2006.01)
*B62D 1/184* (2006.01)

(52) U.S. Cl.
CPC ............. *B62D 1/192* (2013.01); *B62D 1/184* (2013.01); *B62D 1/185* (2013.01); *B62D 1/195* (2013.01)

(58) Field of Classification Search
CPC ........ B62D 1/192; B62D 1/184; B62D 1/195; B62D 1/185
See application file for complete search history.

(56) References Cited

U.S. PATENT DOCUMENTS 5,476,284 A * 12/1995 DuRocher .............. B62D 1/192
 188/371
6,378,903 B1 * 4/2002 Yabutsuka ............. B62D 1/195
 188/371
(Continued)

FOREIGN PATENT DOCUMENTS

CN 203186401 U 9/2013
CN 104002852 A 8/2014
(Continued)

OTHER PUBLICATIONS

Chinese Office Action, dated Jan. 4, 2019, in Chinese Application No. 2016106454448.8 and English Translation thereof.

*Primary Examiner* — Paul N Dickson
*Assistant Examiner* — Timothy Wilhelm
(74) *Attorney, Agent, or Firm* — McGinn I.P. Law Group, PLLC.

(57) ABSTRACT

A steering device includes a column pipe, an outer column A, a fixed bracket, a stopper bracket, and a tightening tool. The stopper bracket has a first suspended plate-like portion and a second suspended plate-like portion. A telescopic long hole and an impact absorbing long hole into which a bolt shaft can be inserted from the front side toward the rear side are formed in each of the first and second suspended plate-like portions. A first collapse portion that is bent by colliding with the bolt shaft is provided between the telescopic long hole and the impact absorbing long hole of either the first suspended plate-like portion or the second suspended plate-like portion. A second collapse portion is provided as an inclined side on either the top sides or the bottom sides of the impact absorbing long holes of the first and second suspended plate-like portions.

12 Claims, 6 Drawing Sheets

(56) References Cited

U.S. PATENT DOCUMENTS

| | | | | |
|---|---|---|---|---|
| 7,311,333 | B2* | 12/2007 | Sato | B62D 1/184 |
| | | | | 280/775 |
| 8,474,869 | B2* | 7/2013 | Sulser | B62D 1/184 |
| | | | | 280/775 |
| 8,539,855 | B2* | 9/2013 | Schnitzer | B62D 1/184 |
| | | | | 280/775 |
| 9,187,116 | B2* | 11/2015 | Yokota | B62D 1/192 |
| 9,365,234 | B2* | 6/2016 | Moriyama | B21D 26/033 |
| 9,540,031 | B2* | 1/2017 | Tagaya | B62D 1/184 |
| 9,789,897 | B2* | 10/2017 | Yamamoto | B62D 1/192 |
| 2005/0173914 | A1* | 8/2005 | Sadakata | B62D 1/181 |
| | | | | 280/777 |
| 2007/0068311 | A1* | 3/2007 | Shimoda | B62D 1/184 |
| | | | | 74/493 |
| 2014/0230596 | A1 | 8/2014 | Kwon | |

FOREIGN PATENT DOCUMENTS

| | | | |
|---|---|---|---|
| JP | 2002-337699 | A | 11/2002 |
| JP | 2004-082758 | A | 3/2004 |
| JP | 2012-040949 | A | 3/2012 |

\* cited by examiner

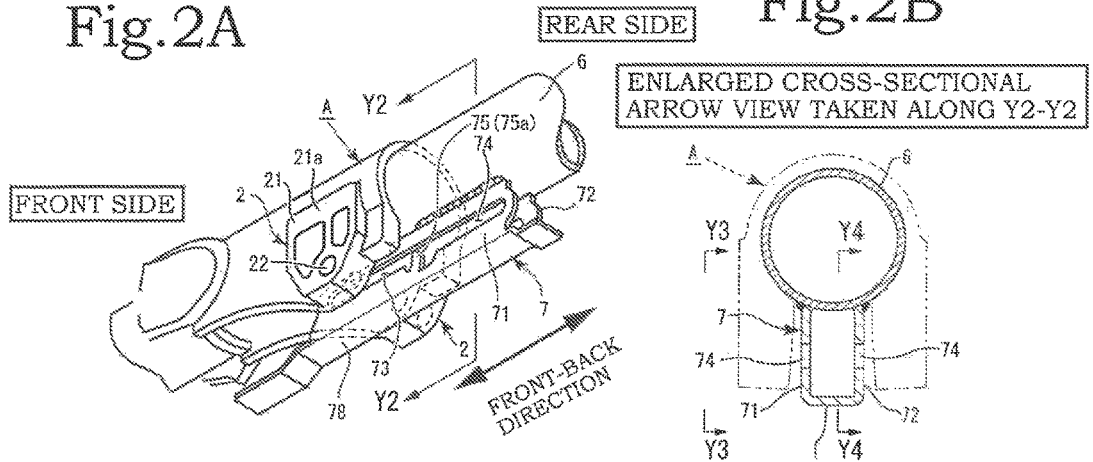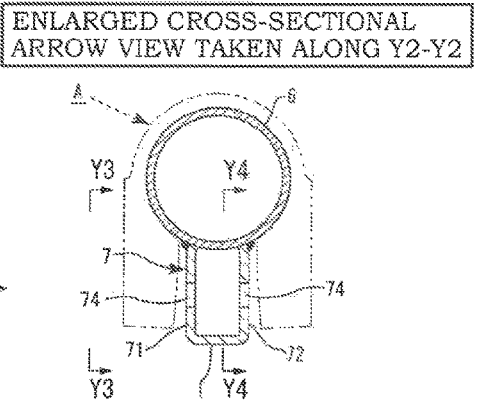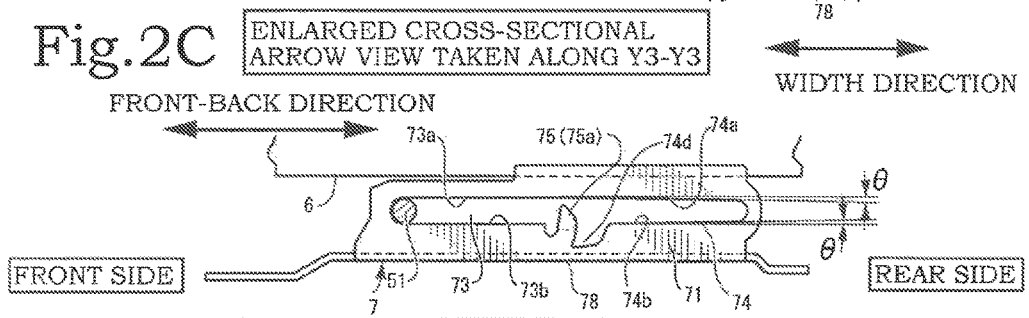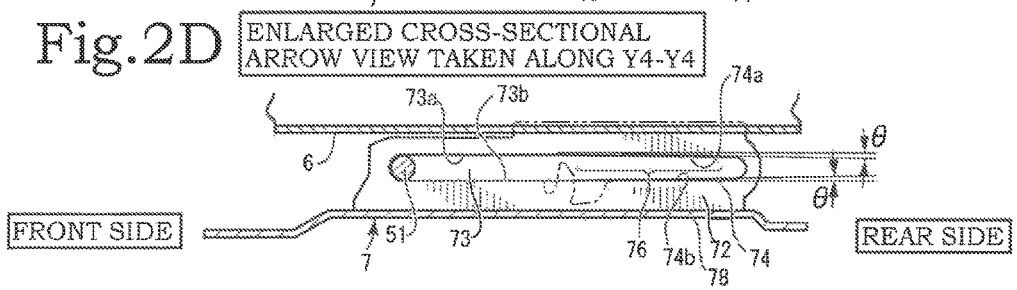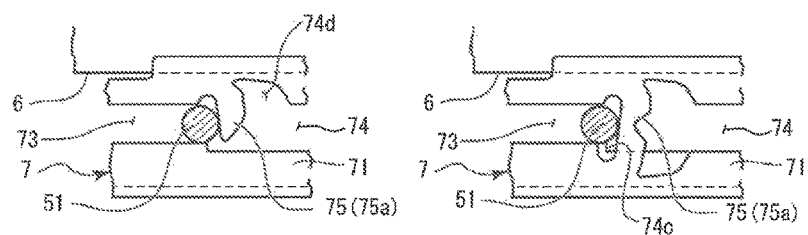

STEERING DEVICE

BACKGROUND OF THE INVENTION

1. Field of the Invention

The present invention relates to a steering device that has a telescopic adjustment mechanism and an impact absorbing mechanism for absorbing the impact of a secondary collision, which share in components, the steering device being capable of moving smoothly from the telescopic adjustment region to the impact absorption region when contracting toward the front side at the time of a secondary collision.

2. Description of the Related Art

There have conventionally been various types of steering devices that are equipped with a telescopic adjustment mechanism and an impact absorber for protecting the driver in a secondary collision caused at a collision accident. In one of the typical structures of these types of steering devices, the column moves along an axial long hole against the pressing force of the bolt shaft at the time of the secondary collision.

Some popular steering devices have a structure in which the width of the axial long hole is smaller than the diameter of the bolt shaft and when a predetermined load acts, an edge portion of the axial long hole moves while being collapsed by the bolt shaft. Japanese Patent Application Laid-open No. 2002-337699 is an example of such prior art. Japanese Patent Application Laid-open No. 2002-337699 is now briefly described hereinafter.

The reference numerals of Japanese Patent Application Laid-open No. 2002-337699 are used as-is in the following explanation, but these reference numerals are bracketed in order to distinguish them from the reference numerals used in the invention of the present application. The steering device disclosed in Japanese Patent Application Laid-open No. 2002-337699 has a second upper bracket (22) having its upper end welded to a column (2), wherein the second upper bracket (22) moves relative to the vehicle body along with the column (2) when the column (2) moves relative to the vehicle body due to an impact.

The second upper bracket (22) is sandwiched between side walls (21a, 21b) of a first upper bracket (21) fixed to the vehicle body, in a relative slidable manner. A screw shaft (51) with a head portion (51') having a lateral shaft center is inserted into first through holes (41) formed in the side walls (21a, 21b) of the first upper bracket (21) and second through holes (42) formed in side walls (22a, 22b) of the second upper bracket (22). The screw shaft (51) has a nut (54) that is tightened with a washer (52), and a lever (53) that is integrated with the nut (54). The shorter diameter of an impact absorbing region (42a) is less than the maximum outer diameter of the shaft (51) in a direction perpendicular to the relative movement direction. The shaft (51) expands the impact absorbing region (42a) by pushing, thereby absorbing impact.

Japanese Patent Application Laid-open No. 2004-82758, on the other hand, discloses a prior art in which the amount of collision energy absorbed by the energy absorbing means at the time of a secondary collision increases as the collapse progresses. A guide hole (79) formed in an inner column (13) is configured with a telescopic portion (111) that has a vertical width for allowing a guide pin portion (75) of a guide bolt (53) to be engaged with clearance, and a collapse portion (113) that extends rearward from the telescopic portion (111) to gradually reduce the vertical width.

The range where the guide pin portion (75) moves forward and backward in the telescopic portion (111) is a telescopic stroke (S1), and the range where the guide pin portion (75) retracts in the collapse portion (113) is a collapse stroke (S2). Since the vertical width of the collapse portion (113) is gradually decreased rearward, an impact absorbing load resulting from a secondary collision of the driver rises in the form of a quadratic curve as the collapse progresses.

SUMMARY OF THE INVENTION

According to Japanese Patent Application Laid-open No. 2002-337699, the both side walls (22a, 22b) of the second upper bracket (22) having a telescopic adjusting portion and an energy absorbing portion and the both side walls (21a, 21b) of the first upper bracket (21) are press-fitted when the lever is tightened. In other words, the side walls (22a, 22b) of the second upper bracket (22) function as the friction surfaces for the side walls (21a, 21b) of the first upper bracket (21). Therefore, when setting an energy absorbing load, the amount of frictional load of the friction surfaces need to be taken into consideration, which makes it difficult to set the energy absorbing load.

Furthermore, when the top side of the impact absorbing region (42a) becomes plastically deformed, the deformed part protrudes toward the side walls (21a, 21b) of the first upper bracket (21), and consequently a large load is likely to be generated. On the other hand, an edge (42c), which is the bottom side of the impact absorbing region (42a), continues to an edge (42d), which is the bottom side of a shaft waiting region (42b), and the width of the top side of the impact absorbing region (42a) is narrow.

Although the energy is absorbed by plastically deforming the top side by means of the screw shaft (51), the screw shaft (51) also comes into abutment with the edge (42d) to generate a load, possibly deforming the impact absorbing region (42a) downward. When the impact absorbing region (42a) is deformed, a desired energy absorbing load cannot be obtained. Moreover, because the shaft waiting region (42b) and the impact absorbing region (42a) are formed in a continuous manner, there is a possibility that the screw shaft (51) bites into the impact absorbing region (42a) at the time of a forceful telescopic adjustment, disabling the telescopic adjustment.

According to Japanese Patent Application Laid-open No. 2004-82758, because the telescopic portion (111) and the collapse portion (113) of the guide hole (79) are formed in a continuous manner, there is a possibility that the guide pin portion (75) bites into the collapse portion (113), as with Japanese Patent Application Laid-open No. 2002-337699. Therefore, an object of the present invention is to provide a steering device that has a telescopic adjustment mechanism and an impact absorbing mechanism for absorbing the impact of a secondary collision, which can be shared by the same members, the steering device being capable of moving smoothly from the telescopic adjustment region to the impact absorption region.

In order to achieve the foregoing object, the inventors of the present invention have accomplished the foregoing object by contriving, through diligent study, a first embodiment of the present invention as a steering device having: a column pipe; an outer column that has a wrapping main body wrapping the column pipe and tightening portions expanding and contracting the wrapping main body in a diametrical direction; a fixed bracket that has fixed side portions for sandwiching either side of the outer column in a width direction; a stopper bracket that is fixed to the column bracket and disposed between the tightening portions; and a tightening tool that has a bolt shaft and tightens and releases the tightening portions of the outer column, the stopper bracket, and the fixed bracket, the stopper bracket separating from the tightening portions when the tightening tool tightens the outer column, wherein the stopper bracket has a first suspended plate-like portion and a second suspended plate-like portion at either side in the width direction, the first and second suspended plate-like portions each having a telescopic long hole and an impact absorbing long hole into which the bolt shaft can be inserted from a front side toward a rear side, a first collapse portion, which is a protruding plate piece, is provided between the telescopic long hole and the impact absorbing long hole of the first suspended plate-like portion or the second suspended plate-like portion and bent by colliding with the bolt shaft at the time of a secondary collision, and at least either a top side or a bottom side of each of the impact absorbing long holes of the first and second suspended plate-like portions is provided with a second collapse portion which is an inclined side that becomes smaller in a height direction toward an end of the impact absorbing long hole.

The inventors have accomplished the foregoing object by contriving a second embodiment of the present invention as a steering device, wherein, according to the steering device described in the first embodiment, the second collapse portion provided as an inclined side is formed on the top side of each of the impact absorbing long holes. The inventors have accomplished the foregoing object by contriving a third embodiment of the present invention as a steering device, wherein, according to the steering device described in the first embodiment, the second collapse portion provided as an inclined side is formed on the bottom side of each of the impact absorbing long holes.

The inventors have accomplished the foregoing object by contriving a fourth embodiment of the present invention as a steering device, wherein, according to the steering device described in the first embodiment, the second collapse portion provided as an inclined side is formed on the top side and the bottom side of each of the impact absorbing long holes.

The inventors have accomplished the foregoing object by contriving a fifth embodiment of the present invention as a steering device, wherein, according to the steering device described in the second or third embodiment, a step portion is provided in the vicinity of a starting point of the impact absorbing long hole where the first collapse portion is not formed, the size of an area in the vicinity of the starting point of the impact absorbing long hole in the height direction is greater than the size of the telescopic long hole in the height direction due to the presence of the step portion, and the step portion is provided on the side opposite to the side provided with the second collapse portion in terms of the height direction and is positioned close to the first collapse portion.

According to the present invention, the stopper bracket is configured to separate from the both tightening portions when the outer column is tightened by the tightening tool, and a load generated when the first collapse portion is collapsed by the bolt shaft, a load generated when the second collapse portion is collapsed, and a frictional load of a telescopic wrapping force can be set separately. In addition to the frictional load, a tipping load of the first collapse portion formed as a protruding plate and a rubbing load of the second collapse portion formed as an inclined side can be set separately, the tipping load being generated by the bolt shaft tipping the first collapse portion. Therefore, an appropriate energy absorbing load can easily be designed.

BRIEF DESCRIPTION OF THE DRAWINGS

FIG. 2A is a perspective view showing substantial portions according to the present invention;

FIG. 2B is an enlarged, partial cross-sectional arrow view taken along Y2-Y2 of FIG. 2A;

FIG. 2C is an enlarged arrow view taken along Y3-Y3 of FIG. 2B;

FIG. 2D is an enlarged cross-sectional arrow view taken along Y4-Y4 of FIG. 2B;

FIGS. 2E and 2F are each an enlarged view of another embodiment of a first collapse portion of FIG. 2D;

DESCRIPTION OF THE PREFERRED EMBODIMENTS

Embodiments of the present invention are now described hereinafter with reference to the drawings. The wording that indicates the directions mentioned in the present invention includes the front side and the rear side. The front side and the rear side represent the areas based on the front-back direction of an automobile with the steering device of the present invention installed therein. Specifically, of all the constituent members of the steering device, the front wheels of the automobile are located on the front side of the automobile and the steering wheel 8 on the rear side (see FIG. 1A).

Figure 1A:
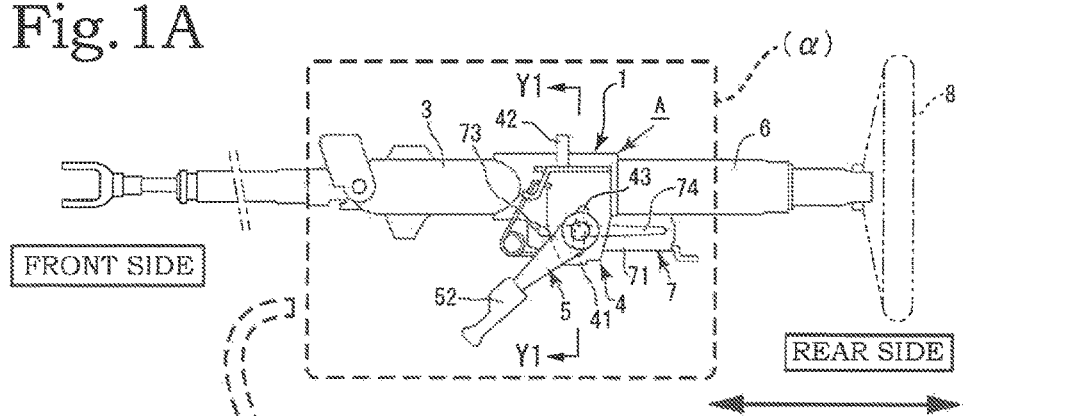
FIG. 1A is a side view of an embodiment of the present invention.
Figure 1B:
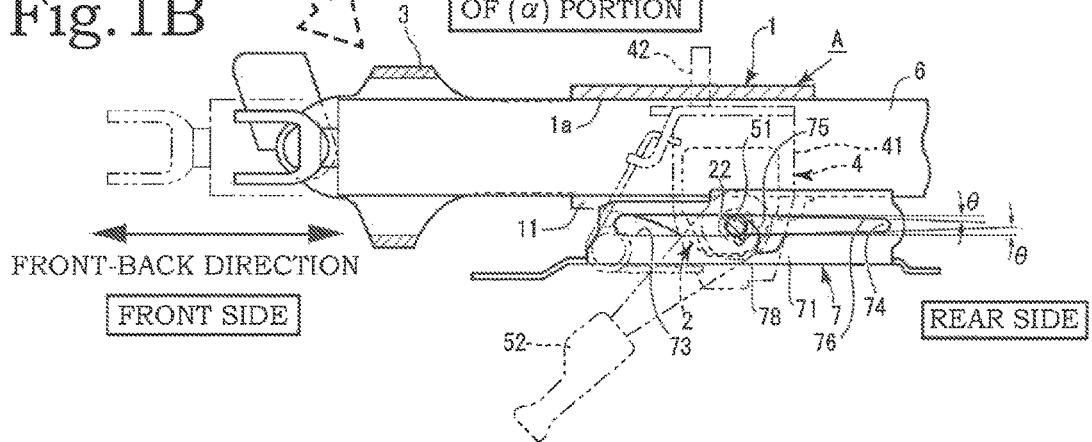
FIG. 1B is an enlarged view showing a partial cross section of the (α) portion of FIG. 1A.
Figure 1C:
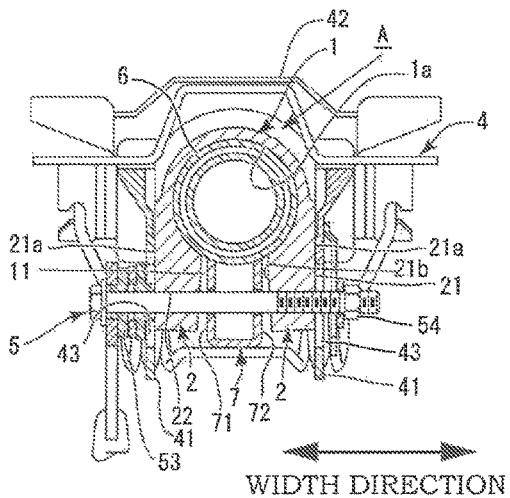
FIG. 1C is an enlarged cross-sectional arrow view taken along Y1-Y1 of FIG. 1A.
Figure 3A:
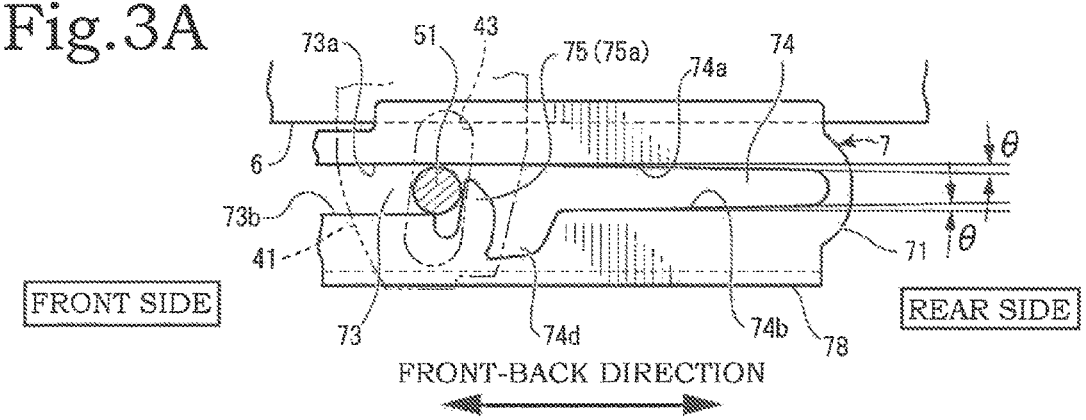
FIGS. 3A to 3D are each an enlarged view of substantial portions, showing a partial cross section of how the first collapse portion is collapsed by a bolt shaft at a first suspended plate-like portion at the time of a secondary collision according to the first embodiment.
Figure 3B:
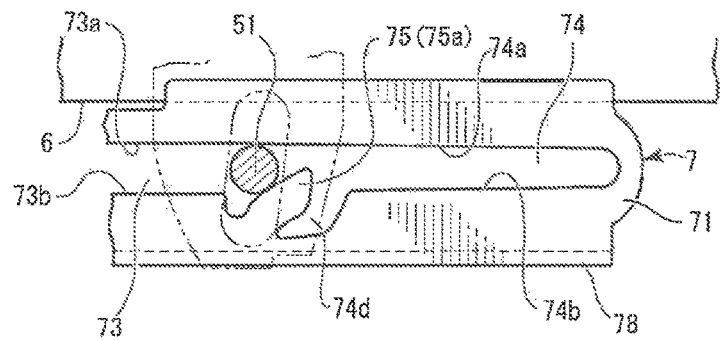
Figure 3C:
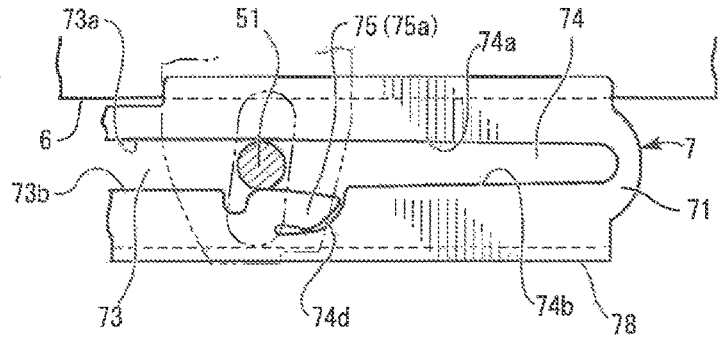
Figure 3D:
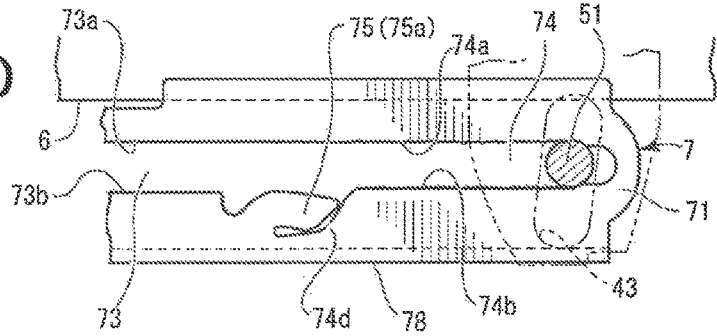
Figure 4A:
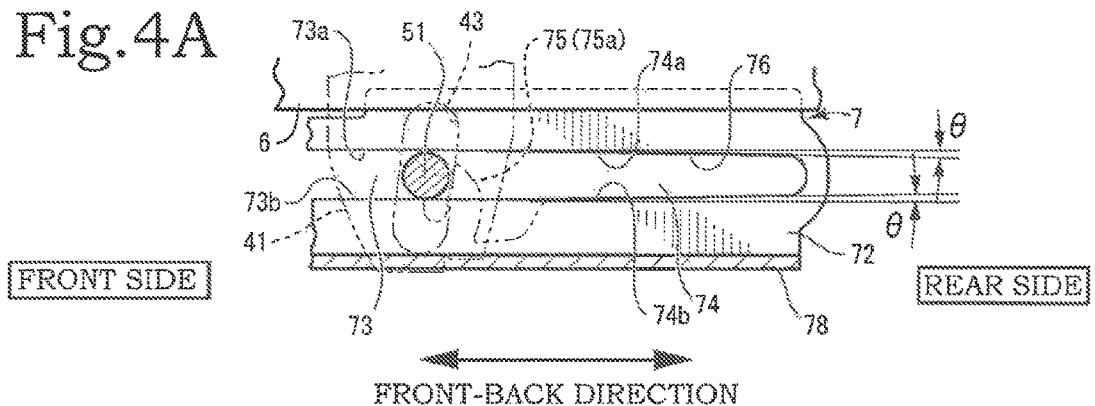
FIGS. 4A to 4D are each an enlarged view of substantial portions, showing a partial cross section of how a second collapse portion is collapsed by the bolt shaft in a second suspended plate-like portion at the time of a secondary collision according to the first embodiment.
Figure 4B:
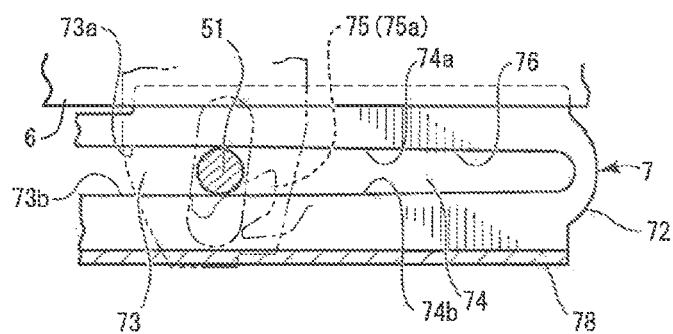
Figure 4C:
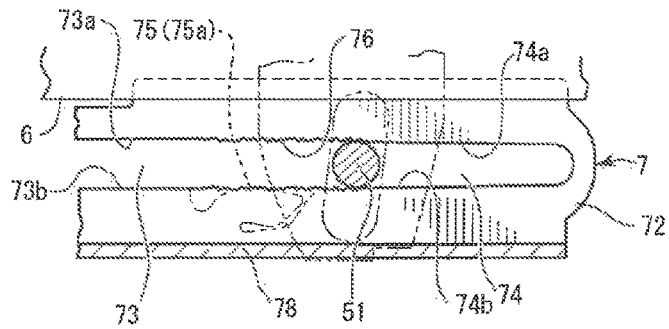
Figure 4D:
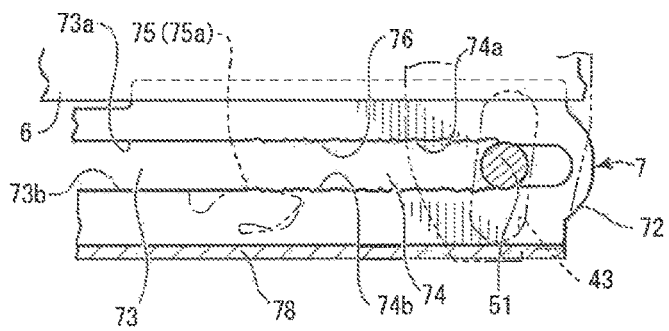

As shown in FIGS. 1A to 1C, the main configuration of the present invention has an outer column A, a fixed bracket 4, a tightening tool 5, a column pipe 6, and a stopper bracket 7. The outer column A is configured by a wrapping main body 1 and a tightening portion 2. The wrapping main body 1 is substantially in the shape of a cylinder with a hollow interior, and specifically, the interior has a wrapping inner circumferential surface portion 1a shaped into a hollow form (see FIGS. 1B and 1C). Slit portions 11 are formed in a lower portion of the wrapping main body 1 in the diametrical direction.

The slit portions 11 are the parts that extend from the front side of the axial direction of the wrapping main body 1 to the rear side and are separated from each other non-continuously in the width direction. As the rim sections of the slit portions 11 facing each other in the width direction come close to each other, the diameter of the wrapping inner circumferential surface portion 1a becomes short, tightening the column pipe 6 stored and installed in the wrapping main body 1, and locking (fixing) the steering wheel.

The wrapping inner circumferential surface portion 1a of the wrapping main body 1 is configured to become slightly larger than the outer diameter of the outer column pipe 6 so that the column pipe 6 can slide easily therein when the steering wheel is in the unlocked state. In addition, the wrapping main body 1 is configured to be long enough to be able to axially support substantially the middle section of the column pipe 6 in the axial direction appropriately. The column pipe 6 protrudes from the front end portion and the rear end portion of the wrapping main body 1 in the axial direction.

Tightening portions 2 are integrally formed in a lower portion of the outer column A (see FIG. 1C). The tightening portions 2 are bilaterally symmetrical and formed integrally at the respective width-wise ends of the slit portions 11. Specifically, the tightening portions are the thick, plate-like sections that are suspended roughly from the width-wise ends of the slit portions 11 or from the vicinity thereof.

Furthermore, the tightening portions 2 are each in the shape of a vertical plate at the front side of the wrapping main body 1 in the axial direction. The rear side of each tightening portion 2 in the axial direction is in the shape of a block and has a plate thickness equivalent to the length between the both ends of the wrapping main body 1 in the horizontal diametrical direction. In addition, at the rear side in the axial direction, the widthwise size of each tightening portion 2 is slightly larger than the outer circumferential diameter of the wrapping main body 1.

The outer surfaces of the tightening portions 2 are referred to as "external surfaces 21a." Also, the inner surfaces of the tightening portions 2 that face each other are referred to as "internal surfaces 21b." The external surfaces 21a are flat and configured in such a manner that while the tightening portions 2 are sandwiched between fixed side portions 41 of the fixed bracket 4, the fixed side portions 41 and the external surfaces 21a of the tightening portions 2 can come into contact with each other. Tightening through holes 22 are formed in the respective tightening portions 2 along the direction perpendicular to the axial direction of the outer column A and parallel to the horizontal diametrical direction of the wrapping main body 1. An arm portion 3 is formed at the front side of the wrapping main body 1 in the front-back direction.

Next, the fixed bracket 4 is configured by the fixed side portions 41 formed at the width-wise ends thereof, and an attachment top portion 42. Adjusting holes 43, long holes extending roughly in the perpendicular direction or vertical direction, are formed in both of the fixed side portions 41 (see FIGS. 1A, 1C). The tightening tool 5 is configured by a bolt shaft 51, a lock lever portion 52, a tightening cam 53, and a nut 54 (see FIG. 1C). The tightening tool 5 is installed using the nut 54 along with the lock lever portion 52 and the tightening cam 53. The column pipe 6 has the middle part of a steering shaft installed in the interior thereof, wherein the steering wheel 8 is installed to the tip of the steering shaft that protrudes from the rear side of the column pipe 6.

Next, the stopper bracket 7 is configured by a first suspended plate-like portion 71, a second suspended plate-like portion 72, and a bottom plate portion 78 (see FIGS. 1A to 1C, 2A to 2C and the like). The first suspended plate-like portion 71 and the second suspended plate-like portion 72 extend along the axial direction of the column pipe 6 and disposed in parallel to each other with a predetermined space therebetween diametrically below the column pipe 6, and the upper ends of the first suspended plate-like portion 71 and the second suspended plate-like portion 72 are fixedly adhered to the column pipe 6. The bottom plate portion 78 is formed at the lower ends of the first and second suspended plate-like portions 71 and 72, and the cross section perpendicular to the longitudinal direction is formed into substantially an inverted gate shape or an angled U-shape by the first suspended plate-like portion 71, the second suspended plate-like portion 72, and the bottom plate portion 78 (see FIG. 2B).

A telescopic long hole 73 and an impact absorbing long hole 74 are formed in each of the first and second suspended plate-like portions 71 and 72 (see FIGS. 2A to 2D). The telescopic long holes 73 are the regions used for telescopic adjustment. The impact absorbing long holes 74 are the regions used when a steering column moves toward the front side at the time of a secondary collision.

The size of the telescopic long holes 73 of the first and second suspended plate-like portions 71 and 72 in the height direction is greater than the diameter of the bolt shaft 51 so that the bolt shaft 51 can be inserted thereinto. More specifically, the telescopic long holes 73 are formed in such a manner that the bolt shaft 51 can be inserted easily thereinto.

Either the first suspended plate-like portion 71 or the second suspended plate-like portion 72 is provided with a first collapse portion 75, a protruding plate piece that is located between the telescopic long hole 73 and the impact absorbing long hole 74 and bent by colliding with the bolt shaft 51 of the tightening tool 5 at the time of a secondary collision (see FIG. 2C). The first collapse portion 75 formed as a protruding plate piece is in the shape of a shaft or a rod and protrudes from one end of the impact absorbing long hole 74 to the other end of the same in the perpendicular direction (the direction perpendicular to the longitudinal direction). More specifically, the first collapse portion 75 is formed in such a manner as to protrude from the lower end side of the impact absorbing long hole 74 toward the upper end side of the same.

Alternatively, in some cases the first collapse portion 75 is formed in such a manner as to protrude from the upper end side of the impact absorbing long hole 74 toward the lower end side of the same (see FIG. 2E). Also, in some cases the longitudinal ends of the first collapse portion 75 formed as a protruding plate piece are formed continuously between the lower end and the upper end of the impact absorbing long hole 74 (see FIG. 2F). It is preferred that the first collapse portion 75 be configured in such a manner as to incline in the direction in which it bends at the base thereof by colliding with the bolt shaft 51 upon a secondary collision (see FIG. 2C).

The following describes the first collapse portion 75 being positioned between the telescopic long hole 73 and the impact absorbing long hole 74 of the first suspended plate-like portion 71. The first collapse portion 75 is collapsed by the pressing force resulting from colliding with the bolt shaft 51 in a secondary collision. In this collapsed state, the first collapse portion 75 formed as a protruding plate piece falls over at the base thereof (see FIGS. 3A to 3D). In other words, the impact is absorbed when the bolt shaft 51 tips the first collapse portion 75. Therefore, a depressed portion 74*d* for storing the first collapse portion 75 when the first collapse portion 75 falls over is formed on the rear side of the section in the impact absorbing long hole 74 where the first collapse portion 75 is formed.

The depressed portion 74*d* has substantially the same shape as the first collapse portion 75 when it falls over. When the first collapse portion 75 falls over and then is stored in the depressed portion 74*d*, the vicinity of the front side of the impact absorbing long hole 74 becomes substantially flat, enabling the bolt shaft 51 to move smoothly up to the rear-side end of the impact absorbing long hole 74. Note that the length of the protrusion of the first collapse portion 75 is, for example, approximately ½ to ⅘ of the first collapse portion 75 in the vertical width direction.

Next, second collapse portions 76 are formed in the impact absorbing long holes 74 of both the first and second suspended plate-like portions 71 and 72. The second collapse portions 76 are each formed as a side that inclines in such a manner that the size of the impact absorbing long hole 74 in the height direction gradually becomes small (narrow) from the starting point of the impact absorbing long hole 74 toward the end of the same (from the front side toward the rear side).

Specifically, one inclined side of the impact absorbing long hole 74 that is formed as the second collapse portion 76 approaches the other side from the starting point of the impact absorbing long hole 74 toward the end of the same (from the front side toward the rear side). Embodiments of the second collapse portion 76 include the first embodiment to the third embodiment. The second collapse portion 76 according to the first embodiment is formed on a top side 74*a* and a bottom side 74*b* of each impact absorbing long hole 74.

The second collapse portion 76 according to the second embodiment is formed on the top side 74*a* of each impact absorbing long hole 74, whereas the second collapse portion 76 according to the third embodiment is formed on the bottom side 74*b* of each impact absorbing long hole 74. According to the second embodiment and the third embodiment, the aforementioned other side of each impact absorbing long hole 74 where the second collapse portion 76 is not formed is parallel (including substantially parallel) to the axial direction of the column pipe 6.

The first embodiment of the configuration of the second collapse portion 76 is described hereinafter, and the second and third embodiments are described at the end. In the first embodiment of the configuration of the second collapse portion 76, the second collapse portion 76 is formed on the top side 74*a* and the bottom side 74*b* of each of the impact absorbing long holes 74 of both the first and second suspended plate-like portions 71 and 72 (see FIGS. 1B, 2C, 2D, 3A to 3D, and 4A to 4D). The second collapse portions 76 are each formed as a side that inclines in such a manner that the size of the impact absorbing long hole 74 in the height direction gradually becomes small (narrow) from the starting point of the top side 74*a* and the bottom side 74*b* of the impact absorbing long hole 74 toward the end of the same (from the front side toward the rear side).

Specifically, on the top side 74*a* and the bottom side 74*b*, the respective second collapse portions 76 that are formed as inclined sides are tilted downward and upward by an angle θ in relation to a reference line, which is a straight line extending along the direction of the axis of the column pipe 6. The starting point of each of the second collapse portions 76 is positioned on the rear side with respect to the position where the bolt shaft 51 of the tightening tool 5 comes into abutment with the first collapse portion 75 formed as a protruding plate piece.

The first to third embodiments are all configured in such a manner that at the time of a secondary collision, the bolt shaft 51 tips the first collapse portion 75, which is a protruding plate piece of the first suspended plate-like portion 71, and thereafter reaches the starting point of the second collapse portion 76 formed as an inclined side. The bolt shaft 51 tips the first collapse portion 75 formed as a protruding plate piece, comes into abutment with the second collapse portion 76 formed as an inclined side while entering the region of the impact absorbing long hole 74, and moves relatively while collapsing the second collapse portion 76.

How the main constituent members of the present invention are assembled is described next. The column pipe 6 is wrapped in the wrapping inner circumferential surface portion 1*a* of the wrapping main body 1 of the outer column A. The stopper bracket 7 fixedly adhered to the column pipe 6, is disposed between the tightening portions 2 of the outer column A. The tightening portions 2 of the outer column A are sandwiched between the fixed side portions 41 of the fixed bracket 4, and the bolt shaft 51 of the tightening tool 5 passes through the adjusting holes 43 of the fixed side portions 41, the tightening through holes 22 formed in the tightening portions 2, and the telescopic long holes 73 of the stopper bracket 7 and installed using the nut 54 along with the lock lever portion 52 and the tightening cam 53 (see FIGS. 1A to 1C).

The tightening cam 53 presses the tightening portions 2 as the lock lever portion 52 turns, and both the tightening cam 53 and the tightening portions 2 are tightened by the tightening tool 5. As a result, the space between the slit portions 11 of the wrapping main body 1 of the outer column A becomes narrow, axially locking (fixing) the column pipe 6 installed in the outer column A.

The stopper bracket 7 is disposed between the tightening portions 2 of the outer column A. Then, when tightening the outer column A using the tightening tool 5, the tightening portions 2 come close to each other but the stopper bracket 7 separates from the tightening portions 2 (see FIGS. 1C and 2B). Therefore, when tightening with the lever, no friction is generated between the tightening portions 2 of the outer column A and the stopper bracket 7, whereby an optimum energy absorbing load can easily be designed (set).

Operations of the steering device at the time of a secondary collision are described next. As a result of a secondary collision, first, the first collapse portion 75 that is formed as a protruding plate piece in the impact absorbing long hole 74 of the first suspended plate-like portion 71 is tipped by the bolt shaft 51 of the tightening tool 5, causing a first peak load of the secondary collision (see FIGS. 3A to 3C). Next, the bolt shaft 51 tips the first collapse portion 75 and moves from the telescopic long holes 73 to the impact absorbing long holes 74.

The top side 74a and the bottom side 74b of each of the impact absorbing long holes 74 of the first suspended plate-like portion 71 and the second suspended plate-like portion 72 are provided with the second collapse portions 76 formed as inclined sides. The bolt shaft 51 comes into abutment with the second collapse portions 76 and moves relatively toward the rear side while pressing or rubbing the second collapse portions 76 (see FIGS. 3D, 4D). A load generated after the peak load can gradually be increased by the bolt shaft 51 pressing or rubbing and collapsing the second collapse portions 76. Therefore, the energy of the secondary collision can be absorbed separately and with a time lag by the first collapse portion 75 and the second collapse portions 76, whereby an appropriate energy absorbing load can be set.

The first suspended plate-like portion 71 and the second suspended plate-like portion 72 that are located on either side of the stopper bracket 7 in the width direction are kept separated without coming into contact with the tightening portions 2 of the outer column A. Therefore, no friction is applied to the stopper bracket 7 by the fixed bracket 4 and the outer column A at the time of telescopic adjustment and secondary collision.

According to this configuration, the load that is generated when the first collapse portion 75 is collapsed by the bolt shaft 51, the load that is generated when the second collapse portions 76 are collapsed by the bolt shaft 51, and the frictional load generated by the telescopic retention force, can be set separately. In addition to the frictional load, the tipping load on the first collapse portion 75 and the rubbing load on the second collapse portions 76 can be set separately, whereby an appropriate energy absorbing load can easily be designed (set).

Figure 5A:
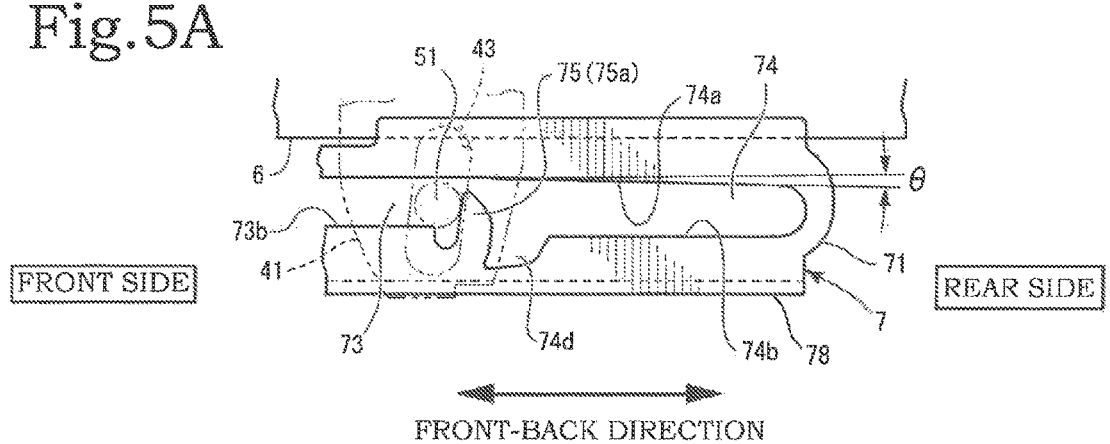
FIG. 5A is a side view of the first suspended plate-like portion of a stopper bracket having the second collapse portion according to the second embodiment.
Figure 5B:
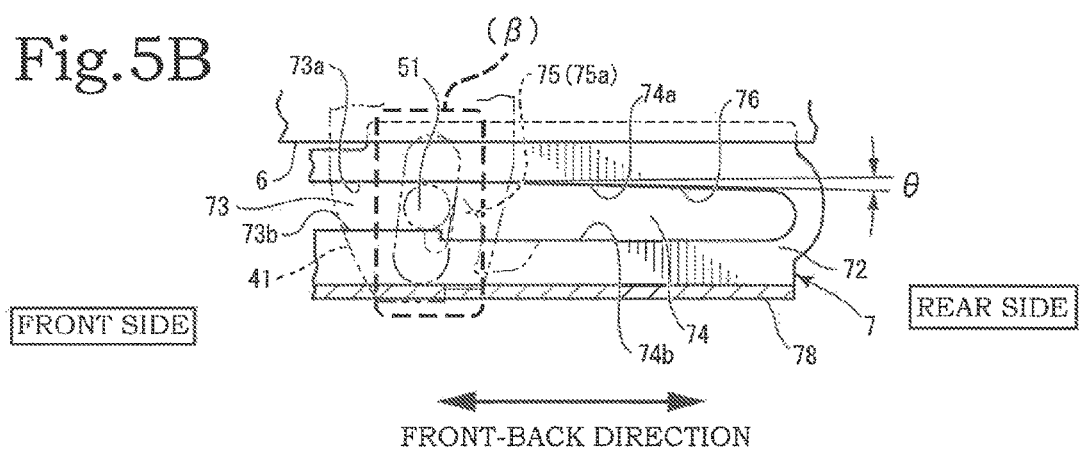
FIG. 5B is a side view of the second suspended plate-like portion of the stopper bracket having the second collapse portion according to the second embodiment.

The second embodiment of the configuration of the second collapse portion 76 is described next. In the second embodiment, the second collapse portion 76 is formed on the top side 74a of each of the impact absorbing long holes 74 of the first and second suspended plate-like portions 71 and 72 (see FIGS. 5A, 5B). The second collapse portions 76 are each formed as a side that inclines in such a manner that the size of each impact absorbing long hole 74 in the height direction gradually becomes small from the starting point of the top side 74a of each impact absorbing long hole 74 toward the end of the same (from the front side toward the rear side). In other words, each second collapse portion 76 is formed in such a manner as to incline downward from the starting point of the top side 74a of each impact absorbing long hole 74 toward the end of the same (from the front side toward the rear side), wherein the end of the top side 74a comes close to the bottom side 74b.

In the second embodiment, the size of each of the impact absorbing long holes 74 in the height direction in the first suspended plate-like portion 71 and the second suspended plate-like portion 72 is the smallest at the rear-side end of each second collapse portion 76 formed as an inclined side, and the size of this rear-side end is formed to be larger than the diameter of the bolt shaft 51. In other words, at the time of a secondary collision, the bolt shaft 51 comes into abutment only with the second collapse portions 76 formed as inclined sides on the top sides 74a of the impact absorbing long holes 74 of the first and second suspended plate-like portions 71 and 72, but does not come into abutment with the bottom sides 74b.

The size in height direction of the area near the starting point of each impact absorbing long hole 74 where the second collapse portion 76 is provided is greater than the size of each telescopic long hole 73 in the height direction, due to a step portion 74c. In the second embodiment, the bottom side 74b of the impact absorbing long hole 74 of the second suspended plate-like portion 72 is formed to be positioned much lower than the position of a bottom side 73b of the telescopic long hole 73 (see FIG. 5B). The step portion 74c is formed in the vicinity of the boundary between the bottom side 73b of the telescopic long hole 73 and the bottom side 74b of the impact absorbing long hole 74 (see FIGS. 5C, 5D).

The step portion 74c is provided on the side opposite to the side of the impact absorbing long hole 74 where the second collapse portion 76 is formed (the top side 74a or the bottom side 74b) in terms of the height direction. The step portion 74c is formed so as to come close to the first collapse portion 75. In the second embodiment, the second collapse portion 76 is formed on the top side 74a, and the step portion 74c configures the step-like section for connecting the bottom side 73b of the telescopic long hole 73 and the bottom side 74b of the impact absorbing long hole 74.

Then, the bottom side 74b of the impact absorbing long hole 74 is positioned lower than the bottom side 73b of the telescopic long hole 73, with the step portion 74c therebetween. In other words, due to the presence of the step portion 74c, a difference in height of m is provided between the bottom side 73b of the telescopic long hole 73 and the bottom side 74b of the impact absorbing long hole 74 (see FIGS. 5C, 5D).

Because the bottom side 74b of the impact absorbing long hole 74 of the second suspended plate-like portion 72 is positioned lower than the bottom side 73b of the telescopic long hole 73 due to the presence of the step portion 74c, the size of the impact absorbing long hole 74 in the height direction is greater than the size of the telescopic long hole 73 in the height direction. In addition, the size of the impact absorbing long hole 74 in the height direction is greater than the diameter of the bolt shaft 51 so that the bolt shaft 51 can be inserted thereinto.

Specifically, at the time of a secondary collision, the bolt shaft 51 only comes into abutment with the second collapse portions 76 that are formed as inclined sides on the top sides 74a of the impact absorbing long holes 74, but does not come into abutment with the bottom sides 74b. For this reason, the bolt shaft 51 can be separated from the bottom sides 74b of the impact absorbing long holes 74 of the first and second suspended plate-like portions 71 and 72 and prevented from coming into abutment with the bottom sides 74b, so that the bolt shaft 51 can come into abutment only with the second collapse portions 76. Therefore, the bolt shaft 51 can only generate the load for collapsing the second collapse portion 76, and the latter-half load that is generated after the first collapse portion 75 is collapsed can easily be set.

Figure 5C:
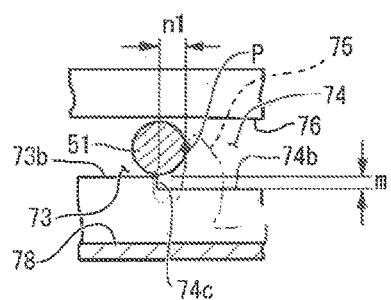
FIG. 5C is an enlarged view showing the (β) portion of FIG. 5B.
Figure 5D:
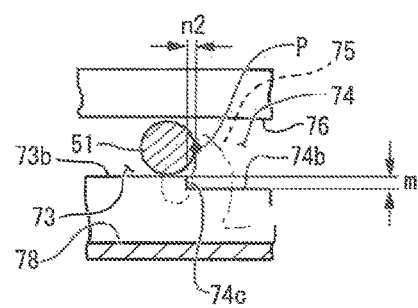
FIG. 5D is an enlarged view showing the configuration of the (β) portion of FIG. 5B according to another embodiment.

The position for the step portion 74c is provided on the front side in relation to the position of the front-side end edge of the first collapse portion 75 of the first suspended plate-like portion 71 (see FIGS. 5C, 5D). The position of the step portion 74c in the front-back direction is determined based on an abutment point P where the bolt shaft 51 comes into abutment with the first collapse portion 75. In FIG. 5C, n1 represents the distance between the position of the abutment point P and the position of the step portion 74c.

In FIG. 5D, n2 represents the distance between the position of the abutment point P and the position of the step portion 74c. The distance n1 is longer than the distance n2. In other words, in the case of the distance n2 between the position of the abutment point P and the position of the step portion 74c, the step portion 74c and the first collapse portion 75 are extremely close to each other. In the case of the longer distance n1 between the step portion 74c and the abutment point P, the bolt shaft 51 is in the region of the telescopic long hole 73 until the bolt shaft 51 starts coming into abutment with and collapsing the first collapse portion 75, resulting in a steady operation of allowing the bolt shaft 51 to tip the first collapse portion 75. In the case of the shorter distance n2 between the step portion 74c and the abutment point P, the bolt shaft 51 is in the region of the telescopic long hole 73 until immediately before the bolt shaft 51 comes into abutment with, tips, and collapses the first collapse portion 75, resulting in a steady operation of allowing the bolt shaft 51 to tip the first collapse portion 75.

Specifically, with both the distance n1 and the distance n2, until the moment where the bolt shaft 51 comes into abutment with the first collapse portion 75 formed as a protruding plate piece, the bolt shaft 51 is kept on the same plane as the bottom side 73b of the telescopic long hole 73, and even immediately after a secondary collision generates an impact, the bolt shaft 51 is supported by the telescopic long holes 73 of the first suspended plate-like portion 71 and the second suspended plate-like portion 72, preventing axial inclination of the bolt shaft 51 and resulting in a steady operation of allowing the bolt shaft 51 to tip the first collapse portion 75.

In this manner, an appropriate impact absorption operation on a secondary collision can be maintained. The top sides 73a of the telescopic long holes 73 and the starting points of the impact absorbing long holes 74 in the first suspended plate-like portion 71 and the second suspended plate-like portion 72 are configured to be in line, thereby allowing the bolt shaft 51 to move smoothly from the telescopic long holes 73 to the impact absorbing long holes 74 at the time of a secondary collision.

Figure 6A:
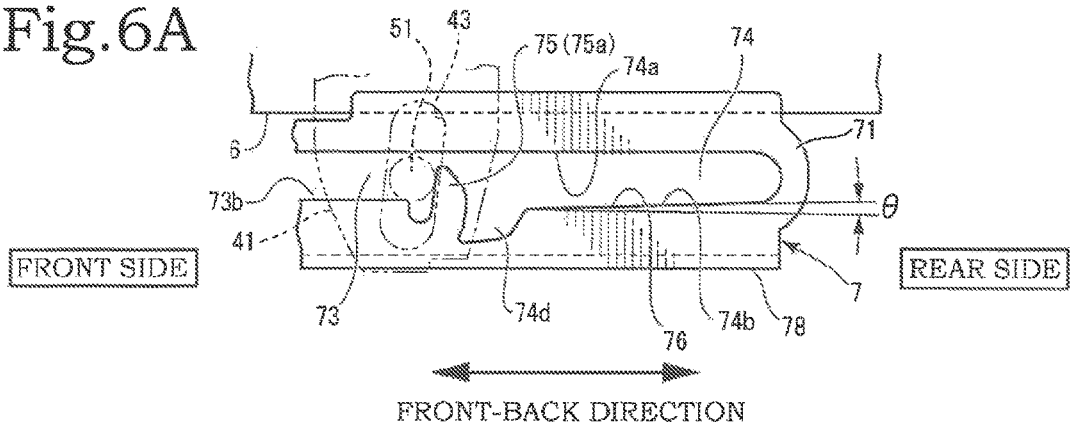
FIG. 6A is a side view of the first suspended plate-like portion of the stopper bracket having the second collapse portion according to the third embodiment.

The third embodiment of the configuration of the second collapse portion 76 is described next. In the third embodiment, the second collapse portion 76 is formed on the bottom side 74b of each of the impact absorbing long holes 74 of the first suspended plate-like portion 71 and the second suspended plate-like portion 72 (see FIGS. 6A, 6B). The second collapse portions 76 are each formed as a side that inclines in such a manner that the size of each impact absorbing long hole 74 in the height direction gradually becomes small (narrow) from the starting point of the bottom side 74b of each impact absorbing long hole 74 toward the end of the same (from the front side toward the rear side). In other words, each second collapse portion 76 is formed in such a manner as to incline upward from the starting point of the bottom side 74b of each impact absorbing long hole 74 toward the end of the same (from the front side toward the rear side), wherein the end of the bottom side 74b comes close to the top side 74a (see FIG. 5B).

Figure 6B:
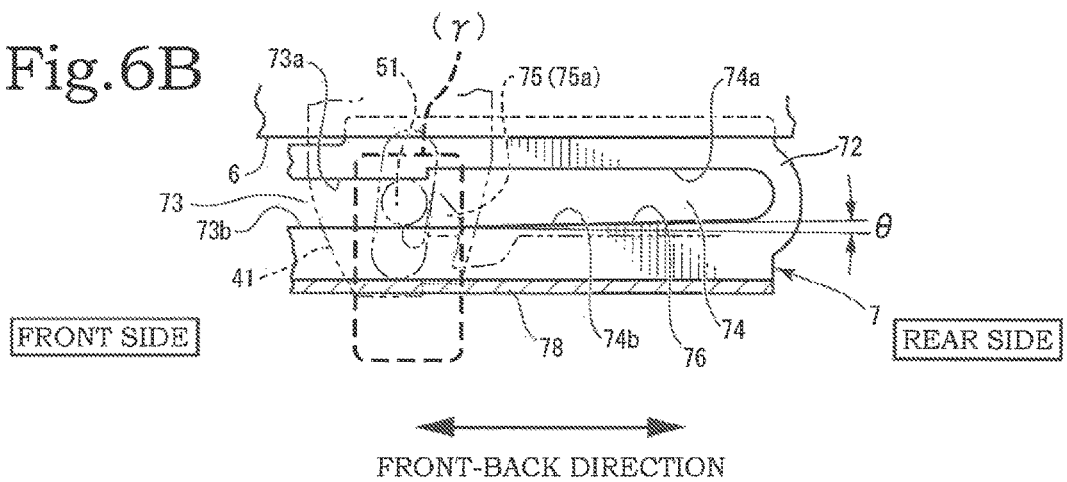
FIG. 6B is a side view of the second suspended plate-like portion of the stopper bracket having the second collapse portion according to the third embodiment.
Figure 6C:
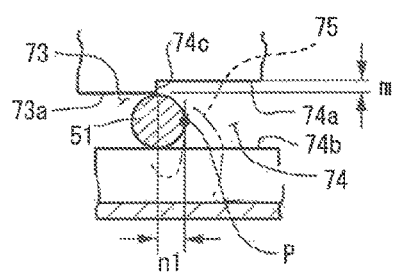
FIG. 6C is an enlarged view showing the (γ) portion of FIG. 6B.
Figure 6D:
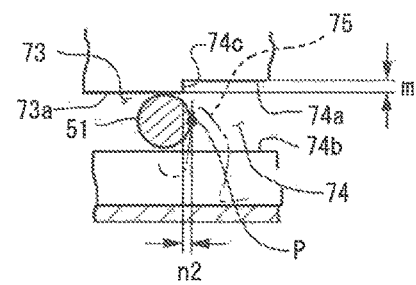
FIG. 6D is an enlarged view showing the configuration of the (γ) portion of FIG. 6B according to another embodiment.

In the third embodiment, the step portion 74c is formed in the vicinity of the boundary between the top side 73a of the telescopic long hole 73 of the second suspended plate-like portion 72 and the top side 74a of the impact absorbing long hole 74 of the second suspended plate-like portion 72 (see FIGS. 6B, 6C, 6D). In the third embodiment, as described above, the configuration and role of the step portion 74c are substantially the same as those of the step portion 74c of the second embodiment, except that the step portion 74c of the third embodiment is present at the upper sides of the telescopic long hole 73 and the impact absorbing long hole 74. Due to the presence of the step portion 74c of the third embodiment, the bolt shaft 51, at the time of a secondary collision, comes into abutment with and collapses the second collapse portion 76 on the bottom side 74b of each of the impact absorbing long holes 74, but does not come into abutment with the top sides 74a.

Because the second collapse portions 76 formed as inclined sides are formed on the bottom sides 74b of the impact absorbing long holes 74, a load of deforming the stopper bracket 7 downward is added to the load of the bolt shaft 51 collapsing the second collapse portions 76, resulting in absorbing more energy. The second collapse portions 76 were described in the first to third embodiments above; however, in any of the embodiments, the latter-half load that is generated after the first collapse portion 75 is collapsed by the bolt shaft 51 can gradually be increased, allowing the latter-half load to be set easily.

In the second embodiment, because the second collapse portions formed as inclined sides are provided on the top sides of the impact absorbing long holes, and the upper side of the stopper bracket is fixedly adhered to the column pipe, the column pipe can prevent deformation of the stopper bracket. Consequently, the bolt shaft can press the second collapse portions in a concentrated manner. Therefore, the second collapse portions can be deformed easily by impact absorption, resulting in a favorable energy absorption.

In the third embodiment, the second collapse portions formed as inclined sides are formed on the bottom sides of the impact absorbing long holes. Therefore, the load of deforming the stopper bracket downward is added to the load of the bolt shaft collapsing the second collapse portions, resulting in absorbing more energy. In the fourth embodiment, the second collapse portions formed as inclined sides are provided on both the top sides and the bottom sides of the impact absorbing long holes, resulting in a steady absorption of more energy.

In the fifth embodiment, the size of the impact absorbing long holes in the height direction is made greater than the size of the telescopic long holes in the height direction. Thus, the bolt shaft can be configured to come into abutment only with the inclined sides within the impact absorbing long holes where the second collapse portions are provided, but to not easily come into abutment with the other sides. Accordingly, only the load of the bolt shaft collapsing the second collapse portions can be generated, and a desired energy absorbing load can be obtained.

In addition, the step portion is formed between the telescopic long hole and the impact absorbing long hole as well as in the vicinity of the first collapse portion. Therefore, the bolt shaft falls in the impact absorbing long hole when bending the first collapse portion formed as a protruding plate piece, preventing insufficient bending of the first collapse portion. Therefore, the first collapse portion can reliably be collapsed.

What is claimed is:
1. A steering device, comprising:
 a column pipe;
 an outer column that includes a wrapping main body wrapping the column pipe and tightening portions expanding and contacting the wrapping main body in a diametrical direction;
 a fixed bracket that includes fixed side portions for sandwiching either side of the outer column in a width direction;
 a stopper bracket that is fixed to the column pipe and disposed between the tightening portions; and
 a tightening tool that includes a bolt shaft, and tightens and releases the tightening portions of the outer column, the stopper bracket, and the fixed bracket, the stopper bracket separating from the tightening portions when the tightening tool tightens the outer column, wherein the stopper bracket includes a first suspended plate-like portion and a second suspended plate-like portion at either side in the width direction, the first and second suspended plate-like portions each including a telescopic long hole and an impact absorbing long hole into which the bolt shaft is configured to be inserted from a front side toward a rear side, wherein a first collapse portion, which includes a protruding plate piece, is provided between the telescopic long hole and the impact absorbing long hole of the first suspended plate-like portion, and is bent by colliding with the bolt shaft at a time of a secondary collision, wherein at least one of a top side or a bottom side of each of the impact absorbing long holes of the first and second suspended plate-like portions is provided with a second collapse portion which includes an inclined side, that becomes smaller in a height direction toward an end of the impact absorbing long hole, wherein a step portion, which includes a step-like section for connecting the telescopic long hole and the impact absorbing long hole, is provided in a vicinity of a starting point of the impact absorbing long hole only in the second suspended plate-like portion where the first collapse portion is not formed, wherein, due to a presence of the step portion, a size of an area in the vicinity of the starting point of the impact absorbing long hole in the height direction is greater than a size of the telescopic long hole in the height direction, and wherein, a position for the step portion is provided on the front side in relation to a position of a front-side end edge of the first collapse portion of the first suspended plate-like portion.

2. The steering device according to claim 1, wherein the second collapse portion, which is provided as the inclined side, is formed on the top side of each of the impact absorbing long holes.

3. The steering device according to claim 2, wherein the step portion is provided on a side opposite to a side provided with the second collapse portion in terms of the height direction and is positioned close to the first collapse portion.

4. The steering device according to claim 1, wherein the second collapse portion, which is provided as the inclined side, is formed on the bottom side of each of the impact absorbing long holes.

5. The steering device according to claim 4, wherein the step portion is provided on a side opposite to a side provided with the second collapse portion in terms of the height direction and is positioned close to the first collapse portion.

6. The steering device according to claim 1, wherein the second collapse portion, which is provided as the inclined side, is formed on the top side and the bottom side of each of the impact absorbing long holes.

7. The steering device according to claim 1, wherein, in the time of the secondary collision, the step portion causes the bolt shaft to come into abutment only with the second collapse portion that is formed as the inclined side.

8. The steering device according to claim 7, wherein the bolt shaft generates only a load that collapses the second collapse portion.

9. The steering device according to claim 1, wherein the first collapse portion is provided between the telescopic long hole and the impact absorbing long hole of the first suspended plate-like portion.

10. The steering device according to claim 1, wherein the first collapse portion is provided between the telescopic long hole and the impact absorbing long hole of the second suspended plate-like portion.

11. The steering device according to claim 1, wherein the second collapse portion is formed on the top side of each of the impact absorbing long holes, and the step portion configures the step-like section for connecting a bottom side of the telescopic long hole and the bottom side of the impact absorbing long hole of the second suspended plate-like portion.

12. The steering device according to claim 1, wherein a position of the step portion in a front-back direction is determined based on an abutment point where the bolt shaft comes into abutment with the first collapse portion.

* * * * *